J. T. MORRISON.
PULLEY.
APPLICATION FILED AUG. 6, 1908.
907,082.
Patented Dec. 15, 1908.
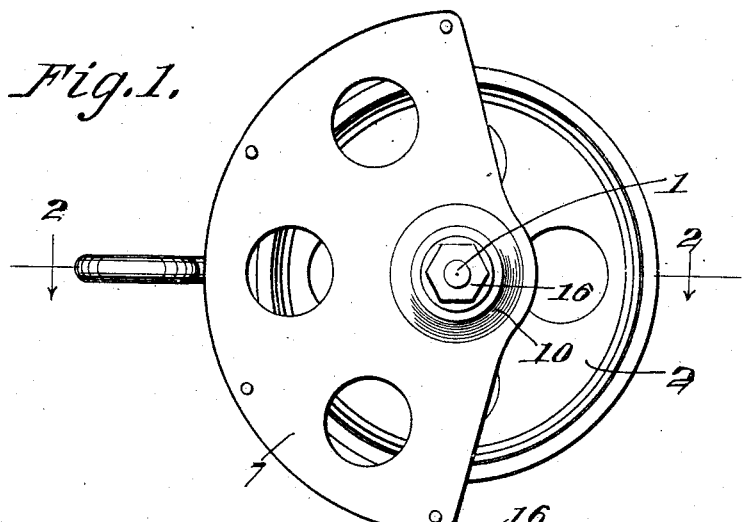
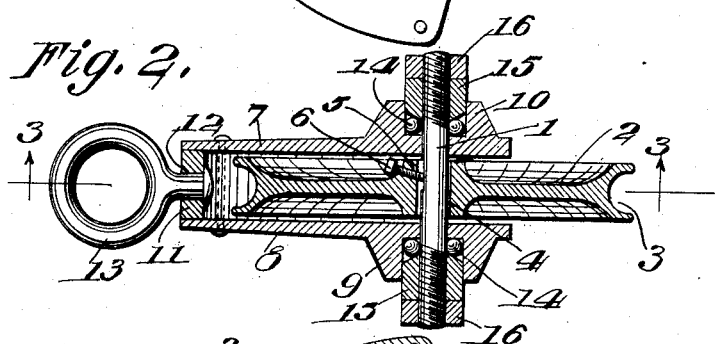
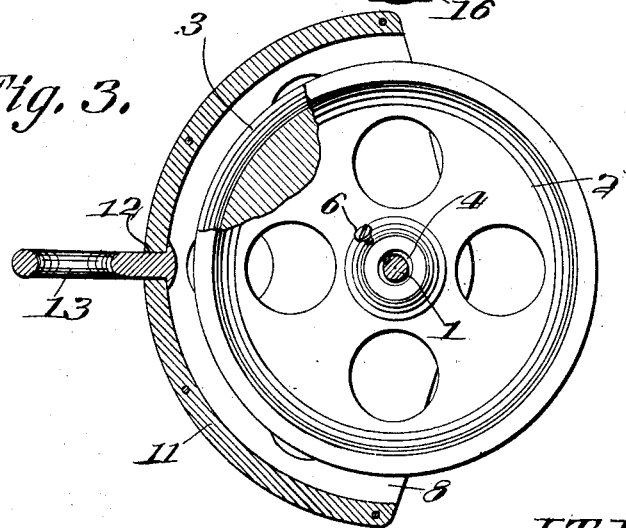
Witnesses
E. D. B. Brown
C. H. Gresbauer
Inventor
J. T. Morrison,
By H. B. Willson & Co.
Attorneys

UNITED STATES PATENT OFFICE.

JOSEPH T. MORRISON, OF HARTFORD, CONNECTICUT.

PULLEY.

No. 907,082.　　　Specification of Letters Patent.　　　Patented Dec. 15, 1908.

Application filed August 6, 1908. Serial No. 447,301.

*To all whom it may concern:*

Be it known that I, JOSEPH T. MORRISON, a citizen of the United States, residing at Hartford, in the county of Hartford and State of Connecticut, have invented certain new and useful Improvements in Pulleys; and I do declare the following to be a full, clear, and exact description of the invention, such as will enable others skilled in the art to which it appertains to make and use the same.

This invention has for its object the production of an improved clothes line pulley provided with anti-friction means.

One of the objects of the invention is the production of a ball or roller bearing pulley having means for guiding a rope arranged on the pulley shaft.

Another object of this invention is the pro20duction of a ball or roller bearing pulley provided with means for guiding a rope thereon and so arranged that the bearings may not become easily affected by moisture of the rope wound on said pulley.

With these and other objects in view, the invention consists of certain novel features of construction, combination and arrangement of parts, as will be more fully described and particularly pointed out in the appended claims, and in the drawings in which, Figure 1 is a side elevation of my improved clothes line pulley; Fig. 2 is a horizontal sectional view taken on line 2—2 of Fig. 1; and Fig. 3 is a vertical sectional view taken on line 3—3 of Fig. 2.

Corresponding and like parts in the following description are indicated in all the views by the same reference characters.

In the drawings, numeral 1 designates a pulley shaft threaded at both ends and with an unthreaded central portion. The pulley 2 formed with a peripheral groove 3 and a central aperture 4 is mounted on the pulley shaft 1 and the hub on said pulley is formed with an oblique aperture 5 through which a screw 6 extends and bears against the shaft 1.

The threaded ends of the shaft 1 extend through guide plates 7 and 8. The guide plates 7 and 8 are formed substantially semi50circular and provided with outwardly facing cones 9 and 10. The guide plates 7 and 8 are held spaced apart by a spacing plate 11 which is bent in the arc of a circle and is riveted to the edges of the guide plates 7 and 8. The spacing plate 11 is formed with a medially disposed aperture 12 through which a ring 13 is adapted to be riveted. A plurality of balls or rollers 14 are disposed in the cones 9 and 10 and a plurality of rounded nuts 15 are threaded on the ends of the shaft 1 and bear against the balls. The nuts 15 are held securely on the shaft 1 by means of locking nuts 16 which are threaded on the extremities of the shaft 1 and against nuts 15.

My improved clothes line pulley is suspended on a hook or line by means of the ring 13, and a rope is passed over the pulley in the ordinary manner. The pulley 2 is rigidly mounted on the shaft 1 and said pulley and shaft rotate on the guide plates 7 and 8. The cones 9 and 10 of the guide plates 7 and 8 may be provided with packing in the form of annular disks. The guide plates 7 and 8 slightly taper from their bearing portions and effectively prevent a rope moving over the pulley 2 from becoming wedged against the sides of said pulley or from getting out of engagement with said pulley. The shaft 1 may be provided with a longitudinal groove adapted to receive the end of screw 6.

The arrangement shown in the accompanying drawings is merely for illustrative purpose and it is understood that the exact proportion of the parts illustrated and described may be changed without departing from the spirit of the invention. The pulley 2 is preferably formed in the proportions shown and described which tend to produce the greatest working efficiency.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described and ascertained the nature of my invention, what I claim as new and desire to secure by Letters-Patent is:

1. A shaft formed with threaded ends, a pulley having a hub formed with an oblique aperture, a screw extending through the aperture and bearing against the shaft, a plurality of bearing guide plates formed with outwardly facing cones mounted on the shaft, a spacing plate for holding spaced apart the guide plates, balls movable on the cones and bearing nuts threaded on the shaft against the balls.

2. A shaft formed with threaded ends, a pulley mounted on the shaft, means for securing the pulley to the shaft, a plurality of guide plates formed with outwardly facing cones, a plate for holding spaced apart the guide plates, a ring connected to the plate, balls disposed in the cones and nuts formed with rounded ends threaded on the shaft and against the balls.

3. A shaft formed with threaded ends, a pulley secured on the shaft, semi-circular guide plates positioned on the shaft, a spacing plate bent in the arc of a circle and riveted to the edges of the guide plates, a ring connected to the middle portion of the spacing plate, ball bearings for the shaft and means for holding the bearings in place.

In testimony whereof I have hereunto set my hand in presence of two subscribing witnesses.

JOSEPH T. MORRISON.

Witnesses:
M. EUGENE CULVER,
GEO. J. FISHER.